(No Model.)

E. E. OUDIN.
IMITATION STAINED GLASS.

No. 279,423. Patented June 12, 1883.

WITNESSES:
Chas. Nida
C. Sedgwick

INVENTOR:
E. E. Oudin
BY Munn & Co
ATTORNEYS.

UNITED STATES PATENT OFFICE.

EUGENE E. OUDIN, OF NEW YORK, N. Y.

IMITATION STAINED GLASS.

SPECIFICATION forming part of Letters Patent No. 279,423, dated June 12, 1883.

Application filed November 3, 1882. (No model.)

*To all whom it may concern:*

Be it known that I, EUGENE E. OUDIN, of the city, county, and State of New York, have invented a new and useful Improvement in Imitation Stained Glass, of which the following is a full, clear, and exact description.

Reference is to be had to the accompanying drawings, forming part of this specification, in which similar letters of reference indicate corresponding parts in all the figures.

Figure 1:
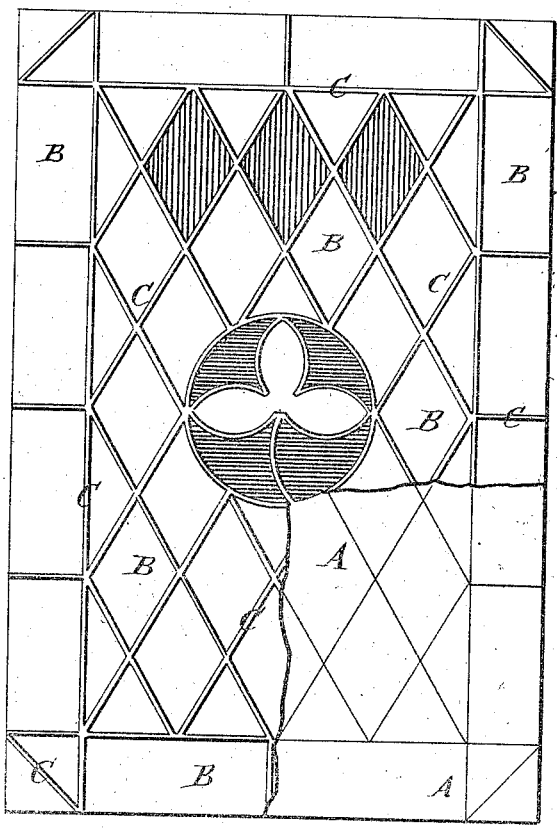
Figure 3:
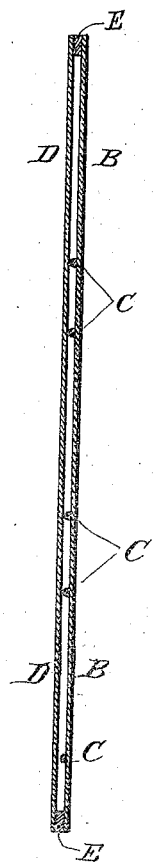
Figure 2:
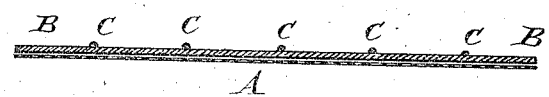

Figure 1 is a plan view of a plate of my imitation stained glass, shown as in process of manufacture, and part being broken away to show the design. Fig. 2 is a section of the same. Fig. 3 is a section of the same, shown as provided with a protecting-plate of glass.

The object of this invention is to provide a substitute for stained glass which will be comparatively inexpensive in manufacture.

The invention consists in imitation stained glass made with a glass plate having imitation leads applied to one side, and the surface of the glass between the said imitation leads coated with transparent colored varnish or lacquer. The imitation leads and the varnish or lacquer may be covered by a second glass plate of the same shape and size as the first plate, whereby the said imitation leads and the varnish or lacquer will be protected from the weather, as will be hereinafter fully described.

Heretofore stained glass has ordinarily been made by placing pieces of stained glass of the desired colors and shapes in a frame in which they have been "leaded" together, as it is called, and thus held in position, and by reason of the difficulty in producing stained glass of the desired colors and shapes, and also of the difficulty in fastening the pieces of glass in position, the plates of glass thus made have been very expensive.

By my invention I am able to prepare at a comparatively small expense glass plates having the appearance and producing the effects of ordinary stained glass by forming upon plates of plain glass an imitation of the colors of stained glass, and also of the leads by which the pieces of stained glass are usually held in position.

In carrying my invention into practical effect, I form upon paper A or other suitable material any design which I wish to embody in the glass plates, which design represents the leads of ordinary stained glass plates. I then place upon the design a plate, B, of plain glass, and pour upon or otherwise apply to the surface of the glass along and directly over the lines of the design, from a suitable vessel or instrument, a small stream of a melted mixture, C, colored to represent the leads of an ordinary stained glass plate. This mixture, when poured upon the surface of the glass, quickly cools and hardens, and produces upon the glass a representation of the design resembling the leads of a stained glass plate from which the pieces of stained glass have been removed. The mixture which I have found best adapted for this purpose is composed of forty-five parts of cement, forty-five parts of sealing-wax, and ten parts of beeswax, together with a small quantity of stearic acid. These ingredients and a suitable quantity of coloring-matter to give the desired color to the mixture, are melted in a vessel or instrument of suitable form to allow the melted mixture to be slowly and regularly poured or discharged therefrom. Various other mixtures can be used for this purpose; but care should be taken to use a mixture that will be affected as little as practicable by the ordinary changes of the weather. After the mixture C has become sufficiently hard, I then pour or flow upon the surface of the glass plate B, and between the lines C of imitation leads, transparent varnishes or lacquers, of the colors which I desire to have in the completed plates, so as to produce such a combination of colors as is seen in an ordinary stained glass plate. With this construction the imitation leads C prevent the varnishes or lacquers of the different colors from uniting with each other.

In applying the varnishes or lacquers to the glass plate B care should be taken that the said plate is not clouded; and for this reason I find it better not to apply or touch the varnishes or lacquers with a brush, but to leave the varnishes or lacquers in thin coatings or layers, such as can be produced by flowing them over the surface of the glass.

Suitable colored varnishes and lacquers are found in the market, and from these and from others similarly prepared and colored to any desired shade the desired colors or shades of color can be produced upon the glass. Any transparent varnish or similar substance that will not be affected by the weather can be used.

After the varnish has dried sufficiently, if the glass plate thus prepared is held toward the light, it will be found to have the appearance of an ordinary stained glass plate. The imitation stained glass plates thus prepared can be set in frames, and can be placed in position with either side exposed to the outer air; but I prefer to arrange them with the smooth sides of the plates outward.

As an additional protection against the effect of the weather and the varying temperature of the atmosphere upon the mixture of which the lines are formed, and upon the varnishes or lacquers which are used in producing the colors, and also for the purpose of obtaining additional luster, I sometimes place upon the plate B of glass prepared as hereinbefore described a second plate, D, of glass, of the same shape and size as the said first plate, and resting upon the imitation leads C, so that the two plates may be as close together as possible. I then fasten the two plates B D together at their edges with cement, plaster-of-paris E, or other suitable means, and the said plates can then be inserted in a frame.

The combined plate thus formed has a hard smooth surface upon both sides, and has the appearance of a plate of stained glass, and can be used for windows and the various other purposes for which stained glass is used.

I am aware that it is not new to form opaque lines and leave transparent spaces between them on plain paper, and then paste this paper on glass window-lights; but

What I claim as new and of my invention is—

1. Imitation stained glass formed of plain glass coated directly on one face with the leaded lines and intermediate coloring, as shown and described.

2. A method of forming the leads on imitation stained glass, which consists in first placing a glass plate upon a pattern or design and then pouring directly over the lines of the pattern a melted coloring solution, as described.

3. A method of coloring glass in manufacturing imitation stained glass, which consists in first forming the lead lines and then flooding the spaces between said lead lines with transparent coloring varnish or lacquer in a fluid state, as described.

4. Imitation stained glass formed of two plain glass plates with intermediate lead lines and colored spaces, as shown and described.

EUGENE E. OUDIN.

Witnesses:
JAMES T. GRAHAM,
C. SEDGWICK.